Figure 1:
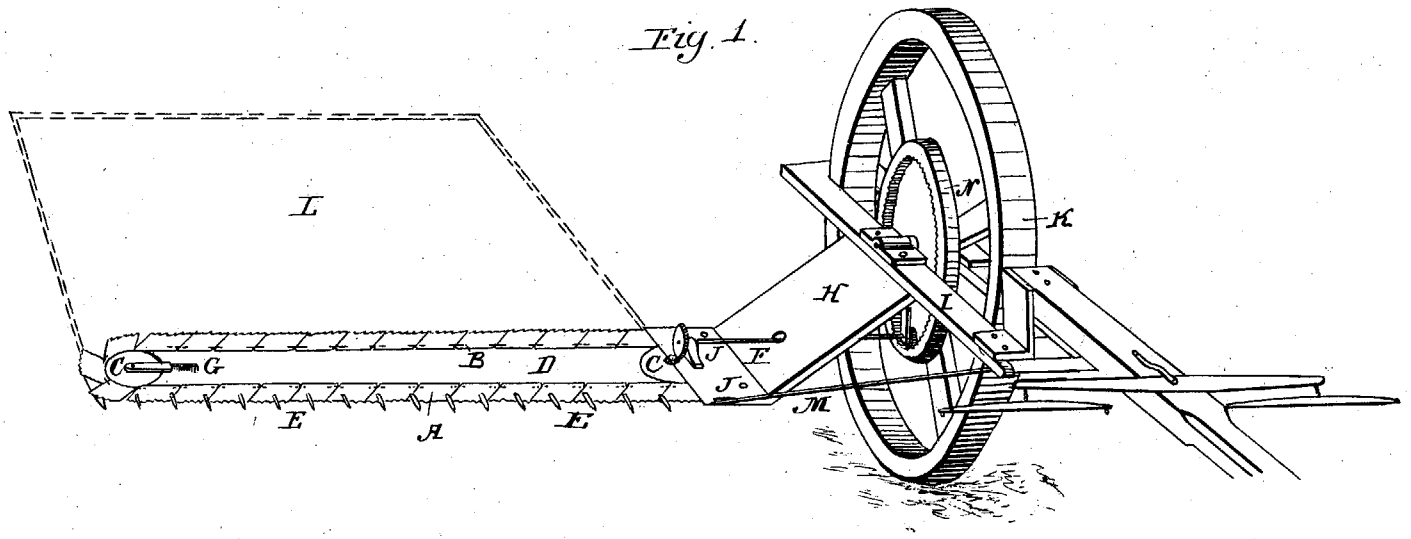

W. F. KETCHUM.

Machine for Reaping and Mowing.

No. 206. Reissued Oct. 21, 1851.

N. PETERS, Photo-Lithographer, Washington, D. C.

UNITED STATES PATENT OFFICE.

WILLIAM F. KETCHUM, OF BUFFALO, NEW YORK.

IMPROVEMENT IN REAPING-MACHINES.

Specification forming part of Letters Patent No. 5,189, dated July 10, 1847; Reissue No. 206, dated October 21, 1851.

*To all whom it may concern:*

Be it known that I, WILLIAM F. KETCHUM, of the city of Buffalo, county of Erie, and State of New York, have invented a new and improved kind of cutter for cutting grain and grass, called an "endless chain cutter," and also an improved method of attaching the rack piece to the frame.

The nature of my invention consists, first, in the crooked arm or coupling-piece in connection and combination with the rack-piece, and the position of the same on the carriage-frame—to wit, attaching it at or near the center, or at any point within the diameter of the driving-wheel, whereby the grain can be raked off the platform on one side, out of the way of the track of the machine, and a greater degree of strength and stability to the rack-piece is attained, as well as producing a more perfect balance of the power applied to propel the machine than if the attachment were made out of the circumference of the driving-wheel; secondly, in an endless chain cutter for cutting grain and grass, and the application of it in such a way as will cause it to run around pulleys with the back of the cutter against them, (the pulleys are fixed on the rack-piece of proper length for the width of the swath to be cut,) with the cutter passing round the pulleys, the cutter being covered all but the edge which comes in contact with the grain or grass.

The object and intention of varying the position of the rack-piece on the frame is to produce a balance by securing it at such a point on either side of the center of the driving-wheel as shall best insure a perfect balance, and at the same time give greater security and firmness to the rack-piece. The distance at which the rack piece must be secured to give the greatest security, &c., cannot be specified, as every machine requires a different position for it; but any point within the space of one foot from the center of the driving-wheel will be found sufficient latitude to give the desired balance.

To enable others skilled in the art to make and use my invention, I will proceed to describe its construction and operation.

I make the endless belt of cutters, as seen at A, of iron and steel segments or pieces about three or four inches long, and I connect them together by lapping the longest pieces on the top of the short pieces, (seen at B.) The ends of the longest pieces meet in the center of the short pieces, and the short pieces are riveted fast with two rivets at one end, and the other end is riveted to the other long piece with one rivet, which is the joint or pivot on which the pieces work or turn. The inner corner of the longest pieces are rounded off, so that the belt may bend or work around the pulleys, (seen at *c c.*) The belt of cutters is placed on the rack-piece D flatwise, and around the pulleys edgewise; or, rather, the back part of the cutter is against the pulleys, and the cutting-edge projecting from them between the rack-teeth. The rack-teeth are fastened to the rack under the belt of cutters, and are seen at E E, projecting out in front of the cutting-edge. The inner corners of the longest pieces or segments of the belt of cutters being rounded allows the belt to yield and work around the pulleys edgewise. The pulley nearest the driving wheel is propelled by cogs on the shaft F, which shaft is propelled by the main cog-wheel, (seen at N.) The other pulley yields to the uneven surface of the belt by a spring, G, bearing against its boxing.

The crooked arm or coupling-piece H, which connects the rack-piece D to the cast-iron frame L, I make of cast-iron, and fasten one end of it to the frame at or near the center or at any point within the inner circumference of the driving-wheel. The other end has a sort of open mortise in it, in which I fasten the rack-piece D with bolts, (seen at J J,) which rack-piece may be made of wood or wrought-iron. By connecting the rack-piece to the crooked coupling-piece H, and the crooked coupling-piece to the frame I, I am not confined to a small driving-wheel, but can use any diameter required. With this improvement of the crooked coupling or elbow-rack my rack and cutters are always on a level with the ground and as near the ground as it may be required for cutting grain and grass.

Although the frame and the center of the driving-wheel where the coupling is attached may be two feet or more from the ground, I attach this coupling or elbow anywhere on the frame within the diameter of the driving-wheel, which enables me to rake the grain off the platform L on one side out of the track of the machine. I brace the rack to the frame with a wrought-iron brace from the front or rear part of the frame, (seen at M.)

Having thus fully described my invention, what I claim therein as new, and desire to secure by Letters Patent, is—

1. The crooked arm or coupling-piece, in connection and combination with the rack-piece, and the attaching and securing the crooked arm (supporting and sustaining the rack-piece) to the frame at or about the center, so as to produce a balance by securing it at such a point on either side of the center of the driving-wheel as shall secure the balance and give firmness to the rack-piece.

2. The endless chain cutter, in combination with the pulleys and rack-teeth, for cutting grain and grass, as above set forth.

In testimony whereof I have hereunto signed my name before two subscribing witnesses.

W. F. KETCHUM.

Witnesses:

B. K. MORSELL,

R. S. HOWARD.